United States Patent Office 3,043,852
Patented July 10, 1962

3,043,852
PROCESS FOR THE PRODUCTION OF CONDENSATION PRODUCTS OF CARBOXYLIC ACIDS IN THE PRESENCE OF THEIR METALLIC SALTS
Maurice Robert Mills, Sevenoaks, England, assignor to Lever Brothers Company, New York, N.Y., a corporation of Maine
No Drawing. Filed June 15, 1959, Ser. No. 820,100
Claims priority, application Great Britain June 16, 1958
13 Claims. (Cl. 260—345.9)

This invention relates to condensation products of carboxylic acids and provides a new method of treating such acids, especially saturated or unsaturated fatty acids, to obtain therefrom useful condensation products.

In application No. 549,173 filed on November 25, 1955, now U.S. Patent No. 2,923,718, there is described a method of converting drying oil fatty acids into film forming condensation products which have enhanced drying properties and are of low acid number and low saponification number. This is done by heating the acid at a temperature of 220–330° C. in the presence of a catalyst comprising an oxygen containing boron compound such as boric oxide, boric acid or ammonium pentaborate, under specified conditions. The products of the application referred to comprise condensation products containing three or more unsaturated long chains per molecule together with additional unsaturated groups, and in general have iodine values substantially higher than those of the initial acids. During the heating of highly unsaturated materials, however, there is a tendency for polymerization to occur leading to lower iodine values than would otherwise be obtained. The more rapid the condensation the more easily is polymerization to an undesirable degree avoided. As indicated above the products of the method referred to are of low acid number and low saponification number and may indeed be substantially neutral and unsaponifiable. They undergo oxidative drying to form tough alkali resistant films without the addition of organic cross-linking agents. In the course of the condensation a considerable increase in the viscosity of the reaction medium occurs as a result of the increase in molecular weight due to condensation plus some degree of polymerization.

It has now been found that new and useful condensation products can be made by heating carboxylic acids of the formula $R.CH_2.CO.OH$ where R is a saturated or unsaturated hydrocarbon radical containing at least six carbon atoms, under conditions generally similar to those specified in the application referred to above, in the presence of a catalyst comprising an oxygen containing boron compound of the kind referred to and a metallic salt of an acid of the kind referred to, especially a metallic soap of the particular acid treated, or a metallic compound capable of forming a soap by reaction with said acid.

The present invention, therefore, provides a process for making condensation products of carboxylic acids of the formula: $R.CH_2.CO.OH$ where R is a hydrocarbon radical containing at least six carbon atoms, wherein the acid is heated with a catalyst of which one component is a salt of a carboxylic acid of the said formula with a soap forming metal and another component is an oxygen-containing compound of boron such as boric oxide, boric acid, boric acid salts of weak or volatile bases, boric acid esters and mixed anhydrides of boric acid and a carboxylic acid of the said formula, the heating being carried out so that water and carbon dioxide are liberated and removed from the reaction zone.

By the process of the invention condensation products useful as plasticizers and as intermediates in the production of synthetic resins have been obtained. Starting with suitable long-chain unsaturated fatty acids condensation products can be obtained which contain two unsaturated chains derived from the acid. These can be epoxidised and the resulting di-epoxy derivatives can be reacted with bi- and multi-functional compounds such as anhydrides of dicarboxylic acids, diamines, di-isocyanates or polyamides to form a useful series of resinous or resin forming condensation polymers. Condensation products made by the process of the invention may also be reacted with polymerizable unsaturated compounds such as styrene and cyclopentadiene.

In the condensation products of the invention, the major constituents appear to be ketonic compounds each containing at least two hydrocarbon radicals derived from the carboxylic acid, and including acyclic ketones and cyclic unsaturated ketones such as pyrones containing four such radicals. The relative proportions in which these two kinds of compound are present can be varied according to the composition of the catalyst. Thus, using as the metal in the catalyst a group IA metal, or a group IIA metal of atomic number at least 12 (that is: magnesium, calcium, strontium or barium), or a metal of atomic number 24 to 28 (that is, chromium, manganese, iron, cobalt or nickel), or lead, substantially higher proportions of acylic ketone can be obtained in the product than when using as catalyst an oxygen containing boron compound alone. The reaction rate may also be considerably enhanced by the presence of these metals, and trials reported below show this acceleration with all of them except chromium and nickel. Copper, zinc, tin, molybdenum, cerium, thorium and selenium have been found to favour acyclic ketone formation but to a much less extent and these metals may also have an accelerating effect of the condensation. Aluminum, antimony and bismuth, on the other hand, give higher proportions of cyclic ketones with some acceleration of the condensation. All these metals besides being soap forming possess heat stable oxides and in the valency state in which they are employed are higher in the electropotential series than silver, mercury and the noble metals. Mercury appears to lie on the border line of utility. Trials with mercuric oxide in conjunction with boric acid have resulted in the free metal distilling off and collecting in the receiver at an early stage in the reaction leaving boric acid as the sole catalyst during the remainder of the heating. The product however appeared to have a somewhat higher content of acyclic ketone than a comparable product made with boric acid alone. With silver oxide no useful result was obtained, the oxide being very rapidly decomposed with excessive frothing that made it impracticable to continue the heating. On the other hand, some metals not much higher than silver and mercury in the electro-potential series and possessing sufficiently low affinity for oxygen to undergo reduction to the metal in the course of the reaction but possessing heat stable oxides, gave useful results. It is preferred, when the object is to favour acyclic ketone formation, to use a metal which is high in the electro-potential series and is of high affinity for oxygen and forms stable wholly basic oxides in which the metal has a valency not greater than two. For this purpose sodium and magnesium are preferred. Beryllium in spite of being high in the electropotential series does not fall within this class since its oxide is amphoteric. (This metal forms covalent compounds similar to those of boron.) Among common metals having a very useful effect in favouring acyclic ketone formation, other than sodium and magnesium, we prefer to use iron in the bivalent state. Chromium, although favouring acyclic ketone formation leads to a much slower reaction than these preferred metals. When it is desired to favour the formation of cyclic unsaturated ketones it is preferred to use a group IIIA or group VA metal, especially aluminium.

By treating long-chain substantially saturated fatty acids by the process of the invention, using as the metal in the catalyst one of those referred to above as favouring acyclic ketone production, condensation products have been obtained which, compared with the acid are higher in melting point and molecular weight, are of low acid value and saponification value, and compared with products obtained by the process of the aforesaid application are higher in melting point but considerably lower in molecular weight and are paler in colour. In condensation products made in this way from unsaturated acids of the kind found in semi-drying oils, drying properties are in general less evident than in the products of the said application and, in fact, these products may be substantially non-drying. In general there is less tendency for polymerization to occur during a condensation carried out under the influence of these catalysts than in their absence and the reaction can therefore be continued for long periods, so effecting a great reduction in the acid and saponification values without undesirable increase in viscosity.

In contrast with the results described in the preceding paragraph, when the metal used is one of those referred to as favouring the formation of cyclic ketones, long chain substantially saturated fatty acids have given products of higher average molecular weight and viscosity, higher iodine value, lower acid value and saponification value, and enhanced drying properties compared with the products of the said application (often in a shorter reaction time), or have given products comparable with those of said application but more quickly.

During the condensation water and carbon dioxide are evolved. It is very desirable, and may be essential if the condensation is to be effected in a reasonable time and without undesired side-reactions, that these volatile products should be removed as formed, while avoiding the loss of most of the fatty acid. These objects can be achieved, for instance, by effecting the heating with reflux of the fatty acid but removal of the water, under reduced pressure, or by heating the acid (in the presence of the catalyst mixture) in solution in a hydrophobe liquid, evaporation of which entrains the water liberated, water and solvent vapours being condensed, and solvent being returned to the reaction zone while water is trapped and prevented from returning thereto.

Carboxylic acids for use according to the invention have the formula:

R.CH$_2$.CO.OH where R is a saturated or unsaturated hydrocarbon radical containing at least six carbon atoms, for instance an alkyl, alkenyl, aralkyl or aralkenyl group, preferably a hydrocarbon radical containing a long unsaturated hydrocarbon chain, for instance a branched or unbranched chain of at least eight carbon atoms. Of most importance are fatty acids containing unbranched unsaturated chains of 9 to 25, especially 17 to 21 carbon atoms. The invention includes treating a single carboxylic acid as well as treating mixtures of such acids with one another.

Among saturated acids that give useful condensation products when treated by the process of the invention are caprylic, capric, lauric, myristic, palmitic and stearic acids.

Unsaturated fatty acids used may contain only one double bond, as in oleic acid, or there may be present at least one fatty acid which contains two or more double bonds in the molecule, for example linoleic acid. Acids which are free from conjugated double bonds are generally to be preferred. Acids containing the grouping —CH:CH.CH$_2$.CH:CH— give particularly useful products. By using in the condensation, catalysts of the kind described as favouring acyclic ketone formation, monoketones in which both hydrocarbon radicals contain this grouping can be obtained in substantial yields. These ketones are believed to be new products not obtainable easily, or perhaps at all, by prior methods of ketone production. This method of producing acyclic ketones from the corresponding acid is advantageous also in making other ketones in which both hydrocarbon groups are unsaturated (for instance dioleyl ketone from oleic acid) and also in making di-paraffin ketones (for instance laurone and stearone from lauric and stearic acids respectively) and in making di-aralkyl ketones (for instance dibenzyl ketone from phenyl acetic acid).

Suitable mixtures of fatty acids for treatment according to the invention may be obtained from natural glyceride oils, especially vegetable oils such as:

Linseed oil 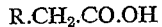 Groundnut oil
Cottonseed oil   Safflower oil
Sunflower oil    Soyabean oil
Rapeseed oil Tall oils acids may also be used with advantage.

Highly unsaturated acids such as occur in marine oils, for instance:

Herring oil    Pilchard oil
Whale oil      Sardine oil may be partly hydrogenated before being subjected to the condensation. The starting material may contain a small proportion, for instance 5 to 10% or less, of other constituents such as, for example, fatty oils, mono-, di- or triglycerides or resin acids. Such constituents have a tendency to slow down the desired reaction and, hence, too great a proportion should be avoided.

The temperature and time of heating will depend primarily on the nature of the products required and of the acids and catalyst used. Suitable temperatures generally lie within the range 180 to 330° C. especially 220 to 290° C. It is generally preferable to continue the heating until the evolution of water substantially ceases which will usually occur within 10 to 50 hours, but useful results can be obtained in shorter heating periods, for instance for 8 to 10 hours.

With mixtures of fatty acids containing individual acids of different types it may be desired to fractionate the original mixture, for example, by distillation, or to distil off the most volatile and less unsaturated acids during the condensation reaction (the reflux column being maintained at the appropriately high temperature for the purpose) to obtain a more unsaturated product.

The boron-oxygen-containing component of the catalyst may be boric oxide, boric acid or an oxygen containing substance capable of forming boric oxide or boric acid under the reaction conditions. Such substances include salts of boric acid with weak bases or volatile bases, for example, zinc borate or ammonium pentaborate, esters of boric acid, such as boric acid trimethyl ester, boric acid triethyl ester, and boric acid mannitol ester, the mixed anhydride of boric acid and acetic acid, and the mixed anhydrides of boric acid and higher fatty acids such as are obtained, for example, from groundnut oil. Boron-oxygen-containing compounds with oxidising properties are undesirable.

The metallic salt used in conjunction with the boron-oxygen-containing substance may be added as such to the carboxylic acid or may be formed in situ from a suitable metal oxide or hydroxide or from another salt of the metal, for instance a salt of a weak acid such as carbonic acid. Metallic soaps of acids not present in the reaction mixture may be used if desired.

The amount of the boron-containing substance may vary widely, for example, between 0.1% and 10% by weight of the fatty acid. Generally an amount of from 1 to 2% by weight is preferred. The proportion of soap or soap-forming component may also vary widely but should preferably be sufficient to neutralise 10 to 50%, especially 10 to 20%, of the carboxylic acid.

The process of the invention may be carried out under vacuum in a stainless steel reaction vessel provided with means for condensing the acids and returning them to the vessel while the water and carbon dioxide liberated are drawn away as vapours. Alternatively the process may be carried out under normal pressure using a suitable solvent to provide the reaction medium and entrain the water and acid vapours the vessel being provided with a reflux condenser and trap in which the condensed water can be separated from the condensed unreacted acid and solvent and drawn off, the acid and solvent being returned to the reaction vessel.

If the reaction is carried out under high vacuum the reaction temperature may not at first reach 220° C. as the mixture, in the first stage of reaction, may boil below that temperature, fatty material passing into the vapour phase together with volatile reaction products. As the reaction proceeds the concentration of fatty acids in the mixture is reduced and the boiling point of the mixture increases so that the reaction temperature can gradually be raised.

When the reaction is carried out in the presence of a water-immiscible solvent, the boiling point of the solvent is preferably greater than 130° C. and not greater than 300° C., the solvent being returned to the reaction vessel. Suitable solvents are xylene (boiling range 135 to 145° C.) which enables heating to be carried out up to 260° C., tetralin (tetrahydronaphthalene, boiling range 205 to 215° C.) which enables heating to be carried out up to 295° C. and decalin (decahydronaphthalene, boiling range 184 to 191° C.) which enables heating to be carried out up to 290° C. and polyethyl benzene (ethyl benzene 1%, diethyl benzene 84%, triethyl benzene 11%, tetraethyl benzene 4%, boiling range of 95%, 175 to 223° C.). Petrol fractions of boiling point up to 200° C. may also be used.

After heating, any unchanged fatty acid in the reaction mixture may be extracted with a suitable solvent, or the reaction mixture may be distilled under vacuum to remove unchanged fatty acid. The product will in general need further purification before use. Thus, it is desirable and for some purposes essential, to remove residual boron containing catalyst and soap. This may be done by washing with hot water after splitting the soap (unless this is water soluble) with mineral acid and neutralizing with alkali. Finally the product may be dried under vacuum. The distillate or solvent extract may be re-used for a further reaction.

The following examples, in which all the parts are by weight, illustrate the invention.

Examples 1 to 5 show the use of catalysts in which the proportion of metal soap is only 1:1, to obtain unsaturated condensation products of lower viscosity and colour than when boric acid is used as the sole catalyst.

EXAMPLE 1

The apparatus comprised a stirred kettle provided with a reflux condenser, a trap at the base of the condenser for separating the condensate into a (lower) aqueous layer and an (upper) non-aqueous solvent layer, a reflux conduit for continuously returning solvent from the upper part of the trap to the kettle and a valve controlled outlet near the bottom of the trap for withdrawing water.

The kettle was charged with 300 parts of a tall oil fatty acid distillate containing 3% of rosin acids, together with three parts of boric acid and the same amount of magnesium oxide. The solvent polyethyl benzene was charged into the trap in such amount that the trap was filled up to the level of the reflux conduit and in addition 40 parts of solvent overflowed through said conduit into the kettle.

The charge was raised to its boiling temperature of 240° C. and kept boiling for six hours after which solvent was withdrawn from the trap to bring the boiling point up to 245° C. and the charge was boiled at this temperature for 8 hours, then (with successive withdrawals of solvent) for 6 hours at 255° C. and finally for 15 hours at 260° C. During the reaction, water and carbon dioxide were evolved. All the water so produced was collected in the trap. There was substantially no loss of fatty acid. At the end of the 15 hour heating stage the solvent was distilled off and the residue was washed with water and dried under reduced pressure.

The product still containing the magnesium soap formed in the reaction was a pale yellow liquid of acid value 7, and saponification value 25. A 30% solution of white spirit therein had a viscosity at 25° C. of 2 poises.

Comparable figures for a product made as in Example 1 but omitting the magnesium oxide were: acid value 15; saponification value 27.5 and viscosity (after dilution with white spirit as in Example 1) 15 poises.

EXAMPLE 2

The process was carried out as in Example 1 but with soya bean fatty acids.

Table 1 shows the characteristics of the initial acid treated (column 2), of the product of Example 2 (column 3) and of a product made from the same acid in substantially the same way but using tetrahydronaphthalene instead of polyethyl benzene and omitting the magnesium oxide (column 4). The figures in column 3 relate to the product still containing the magnesium soap formed.

*Table I*

| Characteristic | Original Acid | Product of Example 2 | Product made without magnesium oxide |
|---|---|---|---|
| Viscosity (undiluted at 20° C.) poises | | 13 | 1,200 |
| Acid value | 203.5 | 13.4 | 6.3 |
| Saponification value | 256.3 | 29.5 | 9.4 |
| Iodine value | 140.2 | 165.0 | 141.9 |
| Lovibond colour (1/16″ cell) red | | 3.1 | 12.0 |
| Yellow | | 20.0 | 70.0 |

EXAMPLE 3

The process was carried out as in Example 1 but using 200 parts of linseed oil fatty acids.

Table II shows the characteristics of the acid treated (column 2) of the product of Example 3 (column 3), of a product obtained in the same way but omitting the magnesium oxide (column 4), and of a product obtained in the same way but omitting the boric acid (column 5).

*Table II*

| Characteristic | Original Acid | Product of Example 3 | Product made without magnesium oxide | Product made without boric acid |
|---|---|---|---|---|
| Viscosity (30% white spirit at 25° C.), poises | | 2.2 | 7.3 | 1.9 |
| Acid value | 184 | 19 | 62 | 96 |
| Saponification value | 200 | 56 | 95 | 141 |
| Iodine value | 196.3 | 184.8 | 147.1 | 135.3 |
| Refractive index at 25° C | 1.4725 | 1.4990 | 1.5070 | 1.4960 |

The figures in column 3 relate to the product still containing magnesium soap.

EXAMPLE 4

The process was carried out as in Example 1 except that: the fatty acid was commercial stearic acid, the amount of polyethyl benzene employed was 35 parts and the heating at 240 to 260° C. was carried out for 30¾ hours. The water liberated during the reaction amounted to 14 parts.

After distilling off solvent and any residual acid the crude residue was treated with 9 parts of concentrated hydrochloric acid to spilt the soap and after washing the residue was substantially neutralized with caustic soda, washed and dried.

In Table III the characteristics of the product of Example 4 (column 3) are compared with those of the untreated acid (column 2) and those of a product made in the same way as that of Example 4 but omitting the magnesium oxide.

*Table III*

| Characteristic | Original Acid | Product of Example 4 | Product made without magnesium oxide |
| --- | --- | --- | --- |
| Melting point (° C.) | 57 | 73.5 | 49.2 |
| Acid value | 205.5 | 1.9 | 1.8 |
| Saponification value | 220 | 15.1 | 9.3 |
| Iodine value | 3.2 | 40 | 40.4 |
| Mean molecular weight (Rast method) | 247 | 416 | 1400 |

EXAMPLE 4a

Example 4 was repeated but using sufficient magnesium oxide to neutralise 50% of the stearic acid and heating for 20 hours at 260° C. by which time 12.3 g. of water (4.1%) had been collected.

The soap free product was of acid value 23.3, carbonyl oxygen content 2.2% and melting point 85° C. (melting point of stearone=88° C.).

EXAMPLE 5

The process was carried out as in Example 1 except that litharge was substituted for magnesium oxide and the heating was carried out at 240 to 270° C. for 36 hours.

The product (still containing lead soap) had the following characteristics: acid value 9; saponification value 39; viscosity of a solution containing 30% of white spirit at 25° C. 0.8 poises.

EXAMPLE 6

The process was carried out as in Example 3 except that litharge was substituted for magnesium oxide.

The product (still containing lead soap) had the following characteristics: acid value 28, saponification value 64, iodine value 170, refractive index at 25° C. 1.5056, viscosity of solution containing 30% of white spirit, at 25° C., 7.5 poises.

In Examples 7 and 8 heating was carried out for relatively short periods with two of the less active metals. The ratio of metallic oxide to boric acid being 1:1.

EXAMPLE 7

A mixed fatty acid (100 g.) obtained from cotton seed fatty acids by fractionation, having an iodine value of 125.8, an acid value of 202.1, and a saponification value of 202.3 was heated in an evacuated flask equipped with a reflux condenser in the presence of 2% of boric acid and 2% of beryllium oxide and boiled violently for about 8 hours during which time the fatty acids distilling were allowed to return to the flask, whereas the water and carbon dioxide formed in the condensation reaction were withdrawn through the vacuum pump. At the end of 8 hours some free acids remaining in the reaction mixture were distilled off. The remaining product (82.5 g.) had an acid value of 4.6. After the addition of lead and cobalt driers the product showed excellent drying properties and a film dried free-to-touch in 1½ hours and through-dry in 3 hours.

The product obtained from a similar experiment but without beryllium oxide weighed only 77 g., had an acid value of 8.7 and required 2 hours and 3¾ hours respectively to dry to the same extent.

EXAMPLE 8

Under the conditions as in Example 7, 100 g. of the same fatty mixture were boiled with 2% boric acid and 2% titanium dioxide. The residue weighed 80.7 g., had an acid value of 3.1 and dried slightly faster than a similar produce made without titanium dioxide.

EXAMPLES 9 TO 30

These examples illustrate the effect of the metallic compound of the catalyst on the relative proportions of acyclic and cyclic ketone in the product. For simplicity a saturated acid, namely lauric acid was used. This acid was chosen because it is readily obtainable in a pure form, does not contain any unsaturation, gives a liquid product when condensed in the presence of boric acid, and forms a ketone melting at 69° C. These considerations facilitate the comparative study of condensation reactions under a variety of conditions, and enable the products to be fractionated by simple crystallisation from alcohol.

The condensation reaction was carried out in a simple, all-glass apparatus with interchangeable ground glass joints, consisting of a two-necked 1 litre flask fitted with a thermometer pocket, and a condenser and water trap of the Dean and Stark type. The trap was graduated in millilitres and provided with a tap at the bottom, which enabled water or solvent to be withdrawn from the system. The flask was set in a heating mantle of suitable size provided with a regulator enabling the heat input to be varied. This was adjusted to maintain a rapid rate of distillation under the chosen conditions, and kept constant throughout the experiments.

In each trial, 300 g. of lauric acid was used together with 1% of boric acid and enough of the metallic compound (specified below for each example) to neutralise 10% of the acid, and 70 ml. of polyethyl benzene, or sufficient to maintain the refluxing temperature at 255–260° C. Whenever a strong base was used in conjunction with boric acid it was added first, and made into a soap before adding the boric acid. In other cases, both catalyst components were added before heating was commenced.

Heating was continued at 255–260° C. until the evolution of water had practically ceased, which took anything from 10 to 50 hours. The rate of evolution was followed by measurements made at regular intervals, and depended upon the type of condensation reaction taking place. In general, the reaction time and total quantity of water evolved were less under conditions favouring acyclic ketone formation than when a substantial yield of cyclic ketone was obtained. It was also noticed that certain compounds containing lead, tin, copper, antimony and mercury were reduced during the process, with the liberation of the free metal. In the case of mercury, the metal distilled into the trap during the first few hours leaving boric oxide as the sole catalyst.

At the completion of the reaction, the solvent was removed by a current of carbon dioxide and the yield of crude product determined. It was then heated with an excess of hydrochloric acid, washed with water until free from the catalyst, dried and filtered.

The percentage of carbonyl oxygen was determined on the soap-free material by the method of Knight and Swern (J. Amer. Oil Chem. Soc., 1949, 26, No. 7, page 366), which was found to give reproducible results, after a slight modification. Cyclic ketones of the pyrone type have been found to give carbonyl oxygen values by this method which are negligibly low so that in the products of the invention the carbonyl oxygen value can be regarded as giving an indication of the relative proportion of acyclic to cyclic ketone present. The free acidity was determined by the usual method, and expressed as a percentage of lauric acid. This was often lower than would be expected if the soaps formed by the basic catalysts had remained unchanged until decomposed by acid at the end of the process. The absence of mineral matter was, therefore, proved by ignition.

The product was divided into three fractions by extracting 100 g. three times with 1200 ml. portions of hot industrial alcohol, decanting off the clear solution in each case. The insoluble residue was recovered, and weighed, and the solution allowed to stand overnight. According to the type of product under examination, the material deposited from solution consisted either of a mass of white crystals, or a reddish coloured oil. These were removed either by filtration or decantation, and the third fraction obtained by recovering the alcohol from the clear solution. If the second fraction consisted of an oil, it was added to the residue which it closely resembled apart from having a somewhat lighter colour. The relative amounts of the three fractions obtained varied widely in the various trials, although reproducible results were given by the individual catalysts.

(a) *The residue.*—This consisted of a dark reddish coloured oil, which remained liquid at room temperature, and resembled the product obtained by the use of boric acid as the sole catalyst, except that it has a somewhat lower refractive index. A sample of the material was examined and found to be a mixture composed mainly of an unsaturated cyclic ketone, most probably a pyrone containing four long chain hydrocarbon groups appendant to the ring, together with a smaller proportion of the acyclic monoketone laurone.

(b) *The crystals.*—There is strong evidence to support view that crystals consist of an impure form of laurone. The purity depends largely upon the amount present, but even when this is small it is possible to raise the melting point to above 67° C. (laurone melts at 69° C.), by recrystallisation. The fact that the purified crystals obtained in experiments with different catalysts are identical has been proved by mixed melting point determinations. A specimen of the crystals has also been examined by chemical and infra-red spectral analysis, with the same conclusion.

(c) *The extract.*—Most of the residual lauric acid is concentrated in the extract, together with some laurone. It seems, however, that these do not account for all of the material, and there may be unidentified substances present which have a low acid and saponification value and are soluble in alcohol.

The fractions obtained as described above all contain some laurone, but most of it is concentrated in the crystals. When the proportion of this fraction is high, the quantity may be taken as an indication of the total amount present.

In Table IV below, the metallic components of the catalyst are specified in column B, the time of reaction in hours is given in column C, the yield expressed as percentage of carboxylic acid taken is given in column D, the water liberated expressed as percentage of acid taken is given in column E, the percentage of unchanged lauric acid in the product is given in column F, and the percentage of carbonyl oxygen in the acid free product, determined by the method referred to above, is given in column G.

*Table IV*

| A | B | C | D | E | F | G |
|---|---|---|---|---|---|---|
| Example | Metal Compound | Time (hrs.) | Yield (percent) | Water (percent) | Acid (percent) | Carbonyl Oxygen |
| 9 | None | 40 | 62 | 10 | 1 | 0.6 |
| 10 | LiOH | 16.5 | 83 | 7.3 | 5.6 | 2.8 |
| 11 | NaOH | 20 | 82 | 6.3 | 12.2 | 3.1 |
| 12 | MgO | 18 | 80 | 6.8 | 4.7 | 2.5 |
| 13 | CaO | 27 | 83 | 7.6 | 14.8 | 2.0 |
| 14 | Ba(OH)$_2$ | 24 | 80 | 9.7 | 7.3 | 2.9 |
| 15 | Cr$^a$ | 31 | 93 | 4.9 | 50.1 | 2.4 |
| 16 | MnO$_2$ | 29 | 80 | 6.2 | 1.3 | 2.3 |
| 17 | FeO | 29 | 79 | 7.3 | 1.0 | 2.5 |
| 18 | Co$^b$ | 31 | 82 | 7.0 | 2.3 | 2.1 |
| 19 | Ni$^a$ | 31 | 93 | 5.7 | 36.8 | 3.3 |
| 20 | PbO | 10 | 62 | 7.7 | 0.4 | 2.5 |
| 21 | Cu$^a$ | 43 | 87 | 7.8 | 18.9 | 1.1 |
| 22 | SeO$_2$ | 28 | 84 | 7.2 | 30.0 | 1.0 |
| 23 | Mo$^a$ | 52 | 85 | ---- | 12.0 | 0.9 |
| 24 | ZnO | 32 | 80 | 6.7 | 8.0 | 0.8 |
| 25 | SnO$_2$ | 23 | 82 | 8.4 | 0.4 | 0.7 |
| 26 | Ce$_2$O$_3$ | 37 | 88 | 6.8 | 26.8 | 0.7 |
| 27 | Al$_2$O$_3$ | 27 | 87 | 7.3 | 14.4 | 0.5 |
| 28 | Sb$_2$O$_3$ | 33 | 90 | 6.4 | 25.1 | 0.5 |
| 29 | HgO | 36 | 83 | 9.0 | 10.0 | 0.4 |
| 30 | Be$_2$O$_3$ | 25 | 83 | 9.3 | 5.1 | 0.3 |

$^a$ Laurate.
$^b$ Acetate.

It will be observed that Examples 10 to 20 inclusive give products in which the carbonyl oxygen content is over three times that obtained when the sole catalyst is boric acid, thus showing that the metallic component has greatly favoured the production of acyclic rather than cyclic ketones. The figures for water liberated, when expressed in terms of acid consumed, is consistent with this conclusion being generally less for these examples than for Example 9. (These water-loss figures, of course cannot be regarded as very accurate owing to the possibility of loss and to some uncertainty as to when water ceases to be evolved.) The percentage of crystals obtained by the fractionation described is further supporting evidence. This will be clear from Table V below, wherein the numbers of the examples in column A correspond to those in column A of Table IV, column B shows the percentage of residue, column C the percentage of crystals and column D the percentage of extract, in the crude product still containing unreacted acid.

*Table V*

| A | B | C | D |
|---|---|---|---|
| Example | Residue | Crystals | Extract |
| 10 | 13 | 57 | 30 |
| 11 | 4 | 65 | 31 |
| 12 | 10 | 64 | 26 |
| 13 | 18 | 51 | 31 |
| 14 | 18 | 48 | 34 |
| 15 | 2 | 11 | 87 |
| 16 | 25 | 50 | 25 |
| 17 | 15 | 62 | 23 |
| 18 | 25 | 49 | 26 |
| 19 | 6 | 34 | 60 |
| 20 | 32 | 39 | 29 |

It will be observed that even when, as in Example 15 the product contained as much as 50% of its weight of unreacted acid, 11% of crystals were obtained while in the other examples in this table the percentage ranged from 34 to 65% and was in every case substantially greater than the percentage of residue. On the other hand with metals of the kind referred to above as favouring acyclic unsaturated ketone production, and with boric acid as the sole catalyst, the products were wholly liquid and no substantial quantities of crystals were obtained. With the metals referred to as having a small but positive effect in directing acyclic ketone production crystals were obtained in a few cases, for instance with tin or zinc, but in smaller proportions and accompanied by substantial proportions of residue.

Examples 31 to 34 below show the effect of varying the proportion of boric acid in a catalyst containing 10% of magnesium laurate, the carboxylic acid again being lauric acid.

The results are shown in Table VI where the percentages of residue, crystals, extract and lauric acid are based on 100 parts of soap-free product.

*Table VI*

| Ex. No. | H$_3$BO$_3$, percent | Time, hrs. | Yield, percent | Residue, percent | Crystals, percent | Extract, percent | Acid, percent |
|---|---|---|---|---|---|---|---|
| 31 | 0 | 47 | 92 | 0.5 | 22 | 78 | 58 |
| 32 | 0.5 | 34 | 88 | 1 | 50 | 49 | 23.2 |
| 33 | 1.0 | 18 | 80 | 10 | 64 | 26 | 4.7 |
| 34 | 2.0 | 23 | 83 | 20 | 46 | 31 | 15.2 |

It will be noted that even a small amount of boric acid has a pronounced accelerating effect on the condensation and that there is an optimum amount for speed of reaction round about 1%. As the proportion of boric acid increases the relative proportions of cylic to acyclic ketone in the product, as shown by the ratio of residue to crystals, increases.

Examples 35 to 37 below were carried out in the same way as Examples 31 to 34 but with sufficient magnesium oxide to neutralise 50% of the lauric acid. The results are shown in Table VII.

Table VII

| Ex. No. | H₃BO₃, percent | Time, hrs. | Yield, percent | Residue, percent | Crystals, percent | Extract, percent | Acid, percent |
|---|---|---|---|---|---|---|---|
| 35 | 0 | 21 | 93 | 0 | 7 | 93 | 71.1 |
| 36 | 1 | 15 | 93 | Trace | 61 | 39 | 26.6 |
| 37 | 3 | 17 | 92 | Trace | 54 | 46 | 27.3 |

Examples 38 to 40 show the effect of varying the reaction temperature. The acid used was a mixture obtained by splitting soya bean oil and the catalyst was formed by adding to the acid 1% of its weight of boric acid and 1% of magnesium oxide. The method was the same as that used in Example 12 except that in each example the amount of solvent (polyethyl benzene) was that necessary to give the desired refluxing temperatures. Heat was supplied by electric heating mantles surrounding the reaction vessels and the power input was the same in each example. The results are shown in Table VIII below:

Table VIII

| Example No. | 38 | 39 | 40 |
|---|---|---|---|
| Temperature (° C.) | 215 | 245 | 275 |
| Solvent (ml.) | 250 | 60 | 35 |
| Reaction time (hrs.) | 253 | 28 | 9 |
| Total water (percent) | 5.0 | 6.0 | 6.3 |
| Yield (crude) (percent) | 86 | 82 | 80 |
| Acid value | 6.9 | 12.4 | 12.2 |
| Saponification value | 16 | 22.9 | 22.7 |
| Iodine value | 114 | 111 | 120 |
| Refractive index ($n_D^{25}$) | 1.4961 | 1.4969 | 1.4970 |
| Viscosity (poises, at 25° C.) | 30 | 32 | 30 |
| Carboxyl oxygen (percent) | 1.6 | 1.5 | 1.5 |

EXAMPLE 41

A specimen of oleic acid of 90% purity was processed by the method of Example 12, the catalyst being formed from 1% of boric acid and 1% of magnesium oxide, based on the weight of starting acid, the reaction time being 40 hours and 4.8% (based on the initial acid) of water being collected in the course of the reaction.

The product (92% based on the initial acid) was a light coloured semi-solid material that could be separated into three fractions by extraction with alcohol.

Examination of the soap free product by the methods previously described gave the following results:

| | Percent |
|---|---|
| Residual oleic acid | 10 |
| Carbonyl oxygen | 2.0 |
| Residue | 33 |
| Crystals | ¹ 27 |
| Extract | 40 |

¹ Melting between 31 and 53° C.

Analytical figures for the three fractions were as follows:

| | Residue | Crystals | Extract |
|---|---|---|---|
| Carbonyl oxygen (percent) | 1.0 | 2.2 | 2.0 |
| Acid value | 4.6 | 3.3 | 43.7 |
| Refractive index ($n_D^{25}$) | 1.4832 | 1.4745 | 1.4668 |

From the carbonyl value it was calculated that the acid free product contained approximately 66% of dioleyl ketone. Although a solid fraction was separated the fractionation was not so effective in concentrating the acyclic ketone as in the lauric acid trials. The comparatively pale colour and low refractive index of the residue indicated that little pyrone was formed. The refractive index of a product made by condensation of the same acid in the presence of boric acid alone was 1.4982.

In Examples 42 and 43 the vacuum method was applied to the treatment of soya bean acids. A charge of 40 lbs. of the acid was used in each example together with 181 g. of boric acid and in one case 181 g. of magnesium oxide and in the other 272 g. of caustic soda.

The charge was refluxed under vacuum until the temperature had risen to 260° C., where it was held by automatic control means until the acid value had fallen to the extent specified below. The product, obtained in a yield of about 80%, was then cooled to below 80° C. and treated with an excess of hydrochloric acid to decompose the soap. It was washed several times with hot water to remove all the catalysts and steam distilled at 260° C. to remove residual fatty acids. The product was cooled to 90° C., bleached with 2% of activated earth and filtered. It was semi-solid at room temperature. The results are shown in Table IX below:

Table IX

| Example No. | 42 | 43 |
|---|---|---|
| Metal compound | MgO | NaOH |
| Reaction time (hrs.) | 22 | 34 |
| Acid value | 6.7 | 17 |
| Saponification value | 27.5 | 52 |
| Iodine value | 164 | 154 |
| Refractive index ($n_D^{25}$) | 1.4922 | 1.4919 |
| Carboxyl oxygen | 1.5 | 1.9 |

EXAMPLE 44

The process was carried out as in Example 42 except that the acid was obtained by splitting linseed oil and the reaction time was 31 hours. The soap free product was of acid value 16.5, saponification value 48, iodine value 185, and refractive index 1.4988. The relatively low refractive index compared with pyrones obtained from the same acid indicates that the catalyst has furthered the production of acyclic ketone rather than pyrone. In the two preceding examples the relatively low refractive indices compared with that of the corresponding pyrone confirm the evidence of the relatively high carbonyl oxygen content as to substantial acyclic ketone formation.

What is claimed is:

1. Process for obtaining ketonic condensation products comprising heating an acid of the formula:

$$R—CH_2—COOH$$

where R is a non-acetylenic hydrocarbon radical of 6 to 24 carbon atoms, with a metallic soap of said acid, the metal of said soap being selected from the class consisting of group IA metals, group IIA metals of atomic number at least 12, metals of atomic number 24 to 30, beryllium, aluminum, and tin, at a temperature between 220° and 290° C. in the presence of a catalyst selected from the class consisting of boric oxide, boric acid, boric acid salts of weak bases, boric acid salts of volatile bases, boric esters and mixed anhydrides of boric acid and a carboxylic acid of the said formula, and simultaneously removing from the reaction zone the water and carbon dioxide formed during the reaction.

2. Process according to claim 1, wherein R is a straight-chain alkenyl hydrocarbon radical of 8 to 24 carbon atoms.

3. Process according to claim 1, wherein R is a straight-chain alkenyl hydrocarbon radical having the group —CH:CH.CH₂.CH:CH—.

4. Process according to claim 1, wherein R is a straight-chain alkenyl hydrocarbon radical of 8 to 24 carbon atoms and the metal of the soap is lithium.

5. Process according to claim 1, wherein R is a straight-chain alkenyl hydrocarbon radical having the group —CH:CH.CH₂.CH:CH— and the metal of the soap is lithium.

6. Process according to claim 1, wherein R is a straight-chain alkenyl hydrocarbon radical of 8 to 24 carbon atoms and the metal of the soap is sodium.

7. Process according to claim 1, wherein R is a straight-chain alkenyl hydrocarbon radical having the group —CH:CH.CH$_2$.CH:CH— and the metal of the soap is sodium.

8. Process according to claim 1, wherein R is a straight-chain alkenyl hydrocarbon radical of 8 to 24 carbon atoms and the metal of the soap is magnesium.

9. Process according to claim 1, wherein R is a straight-chain alkenyl hydrocarbon radical having the group —CH:CH.CH$_2$.CH:CH— and the metal of the soap is magnesium.

10. Process according to claim 1, wherein R is a straight-chain alkenyl hydrocarbon radical of 8 to 24 carbon atoms and the metal of the soap is iron.

11. Process according to claim 1, wherein R is a straight-chain alkenyl hydrocarbon radical having the group —CH:CH.CH$_2$.CH:CH— and the metal of the soap is iron.

12. Process according to claim 1, wherein R is a straight-chain alkenyl hydrocarbon radical of 8 to 24 carbon atoms and the metal of the soap is aluminum.

13. Process according to claim 1, wherein R is a straight-chain alkenyl hydrocarbon radical having the group —CH:CH.CH$_2$.CH:CH— and the metal of the soap is aluminum.

References Cited in the file of this patent
UNITED STATES PATENTS

| | | |
|---|---|---|
| 1,058,225 | Easterfield et al. | Apr. 8, 1913 |
| 1,941,640 | Tressler | Jan. 2, 1934 |
| 2,410,096 | Meyer et al. | Oct. 29, 1946 |
| 2,811,559 | Chesrown et al. | Oct. 29, 1957 |